March 13, 1962 B. M. HORTON 3,024,805
NEGATIVE FEEDBACK FLUID AMPLIFIER
Filed May 20, 1960 9 Sheets-Sheet 1
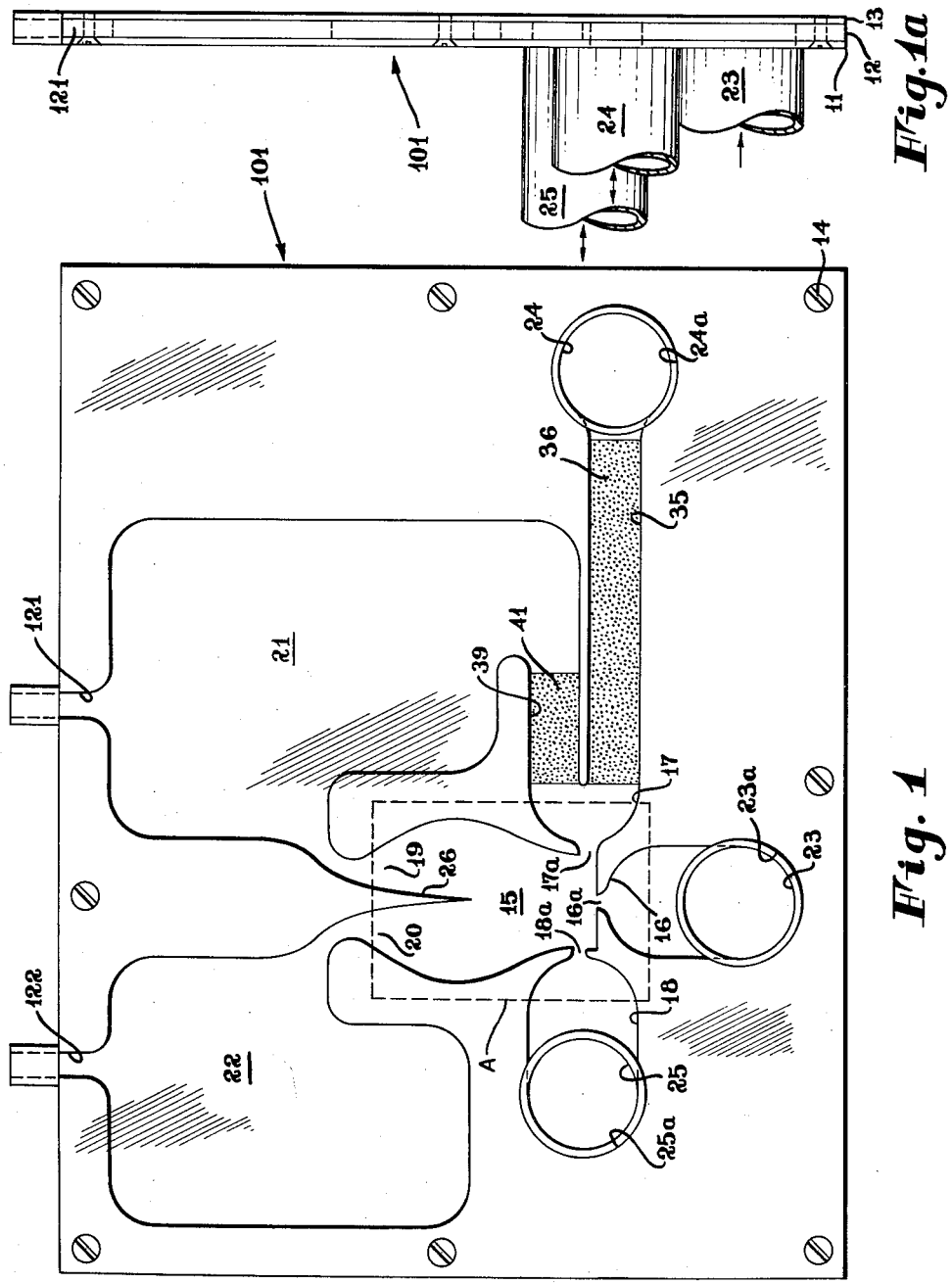
INVENTOR.
BILLY M. HORTON March 13, 1962  B. M. HORTON  3,024,805
NEGATIVE FEEDBACK FLUID AMPLIFIER
Filed May 20, 1960  9 Sheets-Sheet 2

INVENTOR.
BILLY M. HORTON
BY
S.J. Rotondi, A.J. Dupont, F.E. McGee
& J. M. Presson March 13, 1962   B. M. HORTON   3,024,805
NEGATIVE FEEDBACK FLUID AMPLIFIER
Filed May 20, 1960   9 Sheets-Sheet 5

INVENTOR.
BILLY M. HORTON

March 13, 1962 B. M. HORTON 3,024,805
NEGATIVE FEEDBACK FLUID AMPLIFIER
Filed May 20, 1960 9 Sheets-Sheet 6
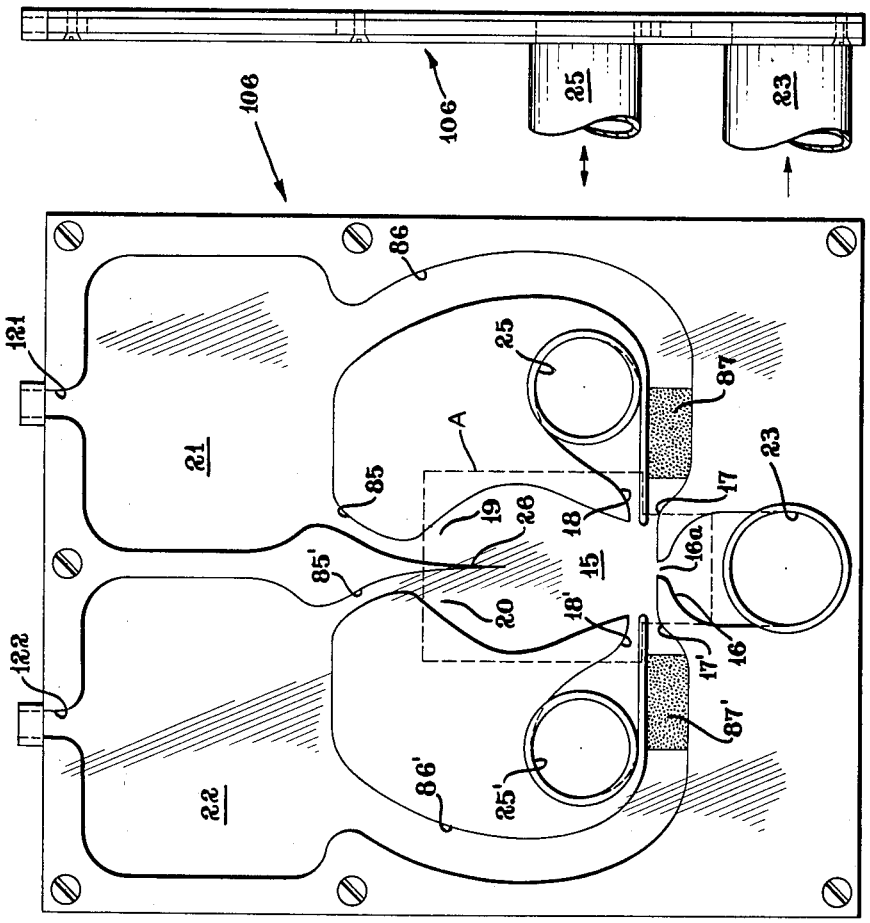
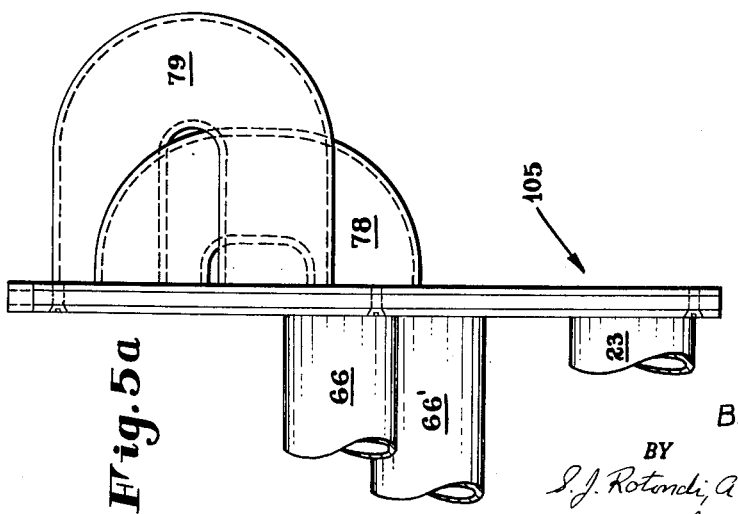
INVENTOR.
BILLY M. HORTON March 13, 1962 B. M. HORTON 3,024,805
NEGATIVE FEEDBACK FLUID AMPLIFIER
Filed May 20, 1960 9 Sheets-Sheet 7

INVENTOR.
BILLY M. HORTON

March 13, 1962

B. M. HORTON 3,024,805

NEGATIVE FEEDBACK FLUID AMPLIFIER

Filed May 20, 1960

INVENTOR.
BILLY M. HORTON

March 13, 1962     B. M. HORTON     3,024,805
NEGATIVE FEEDBACK FLUID AMPLIFIER
Filed May 20, 1960     9 Sheets-Sheet 9

INVENTOR.
BILLY M. HORTON
BY
S.J. Rotondi, A.J. Dupont, F.E. McGee
& J.M. Presson

United States Patent Office 3,024,805
Patented Mar. 13, 1962

3,024,805
NEGATIVE FEEDBACK FLUID AMPLIFIER
Billy M. Horton, 9712 Kensington Parkway,
Kensington, Md.
Filed May 20, 1960, Ser. No. 30,691
17 Claims. (Cl. 137—597)
(Granted under Title 35, U.S. Code (1952), sec. 266)

The invention described herein may be manufactured and used by or for the Government for governmental purposes without the payment to me of any royalty thereon.

This invention relates to fluid systems in general, and more specifically to a fluid system involving a fluid amplifier in which negative feedback is utilized to decrease distortion of the output signal and maintain substantially constant sensitivity of the system to an input signal.

Fluids in motion are widely used in military and industrial systems. Machine tools, steam engines, internal combustion engines, rocket motors, and many other devices depend upon precise and timely control of moving fluids for proper operation. Application of the principles of hydraulics and pneumatics has led to a wide variety of rugged, reliable, fluid-actuated systems including fluid amplifiers. Such fluid amplifiers are described in Ordnance Engineering Design Handbook, ORDP 20-138, Section 3, pages 13.105–13.180, inclusive.

Known fluid amplification and control systems employ moving parts, such as pistons, linkages, valves, diaphragms or vanes, to accomplish their objectives. In many applications, the use of moving parts does not prevent the system from operating as intended. However, in other cases a system with moving parts suffers limitations because of friction, wear and deterioration, thermal expansion, or because of the inertia or weight of these parts. In particular the response time of such fluid-actuated system is severely limited by the inertia of these moving parts. From the viewpoint of reliability, ruggedness and storage life, as well as response time, simplification of a system by elimination of moving parts is highly desirable.

It was discovered recently that a fluid-operated system having no moving parts other than the fluid could be constructed so as to provide fluid systems in which the proportion of the total energy of a fluid stream delivered to an output orifice or utilization device is controlled by a further fluid stream of lesser total energy. These systems are generally referred to as fluid amplifiers.

The fluid amplifier may be one which utilizes stream-interaction as disclosed in the patent application of Billy M. Horton entitled "Fluid-Operated System," Serial No. 848,-878, filed October 26, 1959, and now abandoned. Or the amplifier may utilize boundary layer lock-on control as disclosed in the patent applications of Romald E. Bowles and Raymond W. Warren, Serial No. 855,478, filed November 25, 1959, and now abandoned, entitled "Multistable Fluid-operated System," and Serial No. 4,830, filed January 26, 1960, and now abandoned, entitled "Fluid Multistable Memory System."

The referenced patent applications disclose pure fluid amplifiers which utilize two categories of fluid dynamic control referred to as "stream interaction control" and "boundary layer control." Both are generally related as beam deflection type fluid amplifiers. The following description is an aid in understanding some of the control principles involved in these two categories of fluid dynamic control systems.

In a stream interaction system a power nozzle is supplied pressurized fluid and issues a power jet or main stream. A control jet is directed against the side of the power jet and deflects the power jet away from the control jet. If there is no splash or bounce of the fluid streams, momentum is conserved and the power jet will flow at an angle with respect to its original direction wherein the tangent of this angle is a function of the momentum of the control stream and the original momentum of the power jet. Thus it is possible to direct a high power jet to a target area or receiving aperture system using a lower power control stream. This constitutes an amplifier. Addition can be accomplished by use of multiple control streams which deflect the power jet in the same direction. Subtraction can be accomplished by use of control streams which deflect the power jet in opposite directions. Multiplication can be accomplished by controlling the strength of both the power jet and the control streams. Control streams of the same total pressure level can be given different weighting or levels of effectiveness by providing the control stream nozzles with suitable relative cross-sectional areas. Algebraic equations can be solved by fluid amplifiers of this type which have suitable arrangements of control stream nozzles wherein each control stream flow is varied in accordance with a separate individual variable.

In boundary-layer-controlled fluid amplifiers, a high energy power jet is directed towards a target area or receiving aperture system by the pressure distribution in the power jet boundary layer region. This pressure distribution is controlled by the wall configuration of the interaction chamber, the power jet energy level, the fluid transport characteristics, the back-loading of the amplifier output passages and the flow of control fluid to the power jet boundary layer region. Whereas side walls are not essential for a stream interaction type fluid amplifier, a boundary layer control fluid amplifier generally uses the side walls for deflection of the power jet. In a boundary layer control fluid amplifier special design of the interaction chamber configuration permits designs wherein the power jet will lock-on to one side wall and remain in the locked-on flow configuration without a control fluid flow. When the power jet is suitably deflected by a control fluid flow it can lock-on to the opposite side wall and remain in the locked-on flow configuration even after the control fluid flow is stopped. Thus this unit possesses positive feedback however the feedback path is created and destroyed each time the power jet is deflected to another position. The feedback path is a flow pattern within the interaction chamber governed by the chamber configuration and the power jet flow.

The fluid amplifiers disclosed in the aforementioned patent applications control the delivery of energy of a main stream of fluid to an outlet orifice or utilization device by means of control fluid flow issuing from a control nozzle generally at right angles to the main stream. The proportion of the relatively high energy main stream delivered to an orifice may be varied as a linear or non-linear function of the relatively low energy of a control stream interacting therewith. Since the energy controlled is larger than the control energy supplied, an energy gain is realized and amplification in the conventional sense is realized.

A fluid system having no moving parts other than the fluid and capable of performing either continuous amplification or a switching function is disclosed in the continuation-in-part application of Billy M. Horton entitled "Fluid-Operated System," Serial No. 855,477, filed November 25, 1959, and now abandoned. In this application, deflection of a fluid stream from one output aperture or tube to another output aperture or tube is effected by feeding some of the fluid flowing out of the fluid amplifier back into the chamber of the amplifier so as to aid the control stream in deflecting the main fluid stream. This action is positive feedback. If the positive feedback provided is sufficiently large, the system becomes bistable. The fluid system disclosed in the aforementioned continuation-in-part application utilizes positive feedback and the fluid output signal is highly sensitive to variations in the pressure of fluid supplied to the power nozzle from which the main fluid stream issues. Consequently, the fluid output signal of this amplifier may vary considerably under these conditions. Some applications require that the fluid system be highly insensitive to variations in fluid supply conditions. For example, it is sometimes desirable that the fluid system be insensitive to variations in pressure of fluid supplied to the power nozzle. Also, it is sometimes desirable that the output signal of a fluid amplifier be a faithful reproduction of the input signal.

Broadly, therefore, it is an object of this invention to provide a negative feedback fluid amplifier having no moving parts other than the fluid.

Another object of this invention is to provide a negative feedback fluid amplifier in which the fluid amplifier has no moving parts other than the moving fluid and which has one or more of the aforementioned characteristics.

Another object of this invention is to provide a negative feedback fluid amplifier in which the gain is maintained substantially constant.

An additional object of this invention is to utilize negative feedback in a fluid amplifier to provide an output flow velocity which has the desired relation to the input signal even though the output fluid pressure varies.

Another object is to utilize negative feedback in a fluid amplifier so as to provide an output fluid pressure which has the desired relation to the input signal even though the output flow rate is varied.

Another important object of this invention is to provide a fluid amplifier in which the amplifier produces a minimum distortion of the relationship between the input signal and the output signal.

The specific nature of the invention, as well as other objects, uses, and advantages thereof, will clearly appear from the following description and from the accompanying drawing, in which:

FIG. 1 is a plan view of one embodiment of the negative feedback fluid amplifier of this invention in which the feedback is responsive to output fluid total pressure.

FIG. 1A is an end view of the system shown in FIG. 1.

FIG. 3A is an end view of the amplifier shown in FIG. 3.

FIG. 4A is an end view of the amplifier shown in FIG. 4.

FIG. 5A is an end view of the amplifier illustrated in FIG. 5 with some of the tubes removed for purposes of clarity.

FIG. 6 is a plan view of a push-pull negative feedback fluid amplifier in which the negative feedback is responsive to output pressure and which is specifically designed to operate with an incompressible fluid.

FIG. 6A is an end view of the amplifier shown in FIG. 6.

Figures 2, 2A:
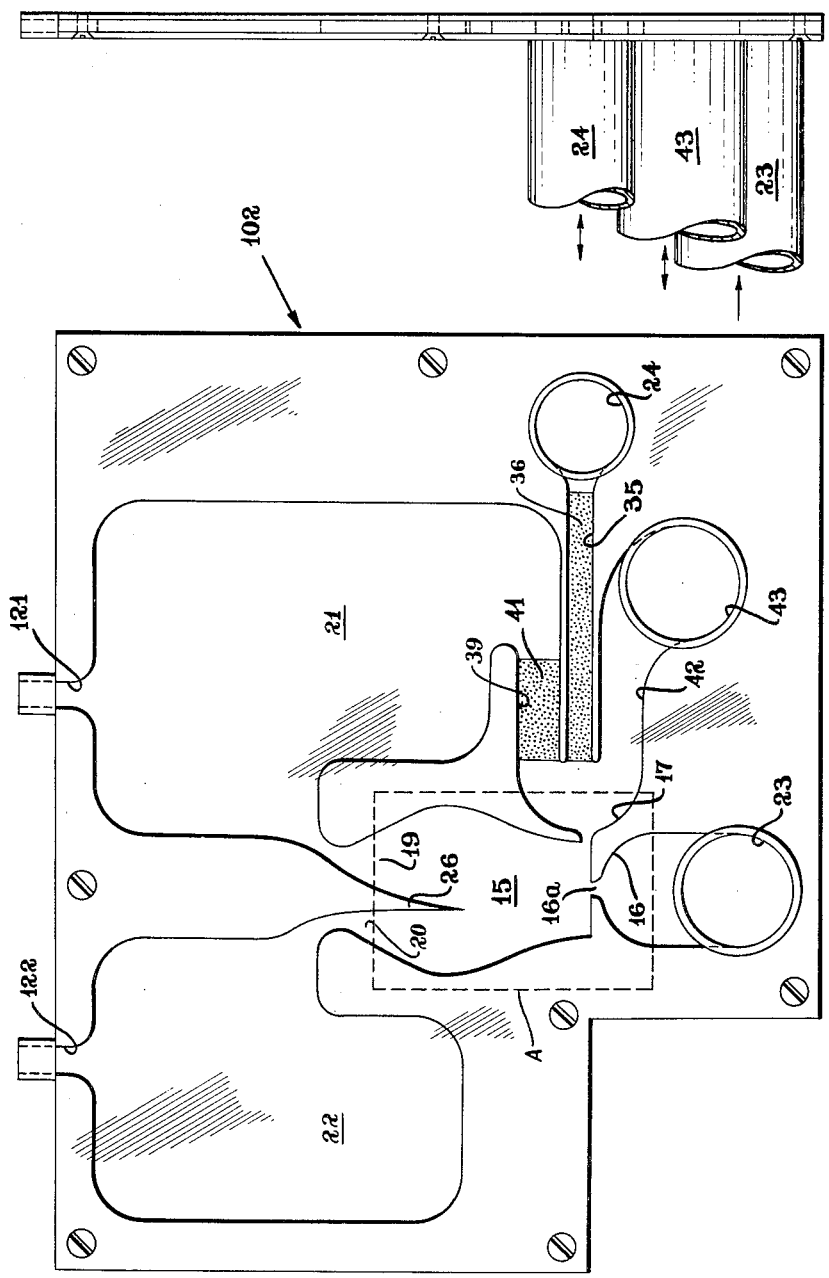
FIG. 2 illustrates another embodiment of a negative feedback fluid amplifier in which the feedback is responsive to output fluid total pressure.
FIG. 2A is an end view of the system shown in FIG. 2.

According to this invention, negative feedback through a fluid path is used in combination with a fluid amplifier. The resulting negative-feedback fluid amplifier, which has no moving parts other than the moving fluid, is capable of amplifying variations in the input signal, and effects a considerable reduction in the distortion of the output signal. In addition, this invention tends to maintain the desired output signal even though there may be changes or variations in pressure, density, viscosity, or other properties of the fluid supplied to the amplifier, or changes in entrained material in the fluid supplied to the amplifier.

In general, when feedback is applied to any fluid amplifier, careful consideration must be given to the way in which variations in fluid flow can be transmitted through the system. A patent application of Billy M. Horton and Romald E. Bowles entitled Fluid Oscillator, Serial No. 21,062, filed April 8, 1960, discloses that feedback can be used in a fluid amplifier having no moving parts to achieve recurring changes in a fluid signal, or oscillation. As disclosed in that application in order for oscillations to occur, it is necessary that the fluid signal which is fed back to the input of the amplifier arrive at the proper time and with sufficient magnitude to regenerate the oscillation.

When negative feedback is employed with a fluid amplifier, it is necessary to provide a feedback path such that no fluid signal exists which when amplified and fed back has the amplitude and timing necessary to produce oscillations. One way of preventing oscillations is to use a very small amount of feedback so that the amplitude of the signal fed back is too small to cause oscillations. However, if only a small amount of negative feedback is used, only slight improvements in operation are obtained.

When a large amount of negative feedback is utilized, the amplitude of the signal fed back is large. The only way to prevent oscillations when the amplitude of the feedback signal is large is to design the complete system so that the timing or phasing of the signal fed back to the amplifier does not permit the build up of oscillation in the system.

In the present invention energy storage devices are used in conjunction with fluid resistors to achieve phasing or timing of the feedback signal in such a way that oscillations cannot occur. These fluid resistors tend to damp out signals which if not damped might cause oscillations.

Referring now to FIGS. 1 and 1A for a more complete understanding of the invention, there is shown one embodiment of a negative feedback fluid amplifier constructed in accordance with this invention. This negative feedback fluid amplifier, referred to by numeral 101, comprises a fluid amplifier A encompassed by dotted lines and an associated feedback system, the details of which will be discussed hereafter. Negative feedback fluid amplifier 101 is formed by three flat plates 11, 12 and 13 (FIG. 1A). Plate 12 is positioned between plates 11 and 13 and is tightly sealed therebetween by machine screws 14. It should be apparent that the particular means by which the plates are secured together is not critical, so long as the connection is sufficiently tight to insure that no fluid can leak from the negative feedback amplifier 101. Plates 11, 12 and 13 may be composed of a metal, plastic, or ceramic, or any other suitable material, and for purposes of illustration these plates are shown as composed of a clear plastic.

Plate 12 is cut out such that the resulting configuration of the plate provides the shape of negative feedback amplifier 101. Amplifier A includes a fluid receiving chamber 15, a power nozzle 16, two opposed nozzles 17 and 18, apertures 19 and 20 and the tip portion of divider 26. Orifices 16a, 17a and 18a are formed by nozzles 16, 17 and 18, respectively, and these orifices vent into chamber 15 as shown. The term "orifices" as used herein includes orifices having converging or diverging walls, or of any conventional shape. Nozzles 16, 17 and 18 communicate with internally threaded bores 23a, 24a and 25a, respectively, formed in plate 11.

Stilling chambers 21 and 22 form a part of the associated feedback system and provide low flow velocity regions and fluid storage means for negative feedback fluid amplifier 101. Nozzle 17 is referred to as the feedback nozzle because it can feed fluid issuing from amplifier A back to amplifier A in order to deflect the main fluid stream issuing from nozzle 16. Nozzle 18 is referred to as the control nozzle because fluid issuing from this nozzle can deflect the main fluid stream so that a greater portion of the stream flows into stilling chamber 21.

Tubes 23, 24 and 25 are externally threaded so that they can be fixed in their internally threaded respective bores 23a, 24a and 25a and thusly communicate with the nozzles comprising amplifier A. The end of each tube extending from plate 11 is suitably connected to sources of fluid under pressure (not shown). It should be evident to those skilled in the art that any suitable means for providing fluid under pressure such as a tank of compressed gas may be used to supply fluid to the associated power control and feedback nozzles.

The fluid under pressure can be air or other gas, or any other compressible fluid. Gas, with or without solid or liquid particles, will work very satisfactorily in amplifier 101. The fluid under pressure can also be an incompressible fluid. When incompressible fluids are to be employed, the stilling chambers of the negative feedback fluid amplifiers shown in FIGS. 1-5 inclusive should be entirely or partially formed of an elastically deformable or compressible material, such as rubber, in order to take advantage of the smoothing action which results from the use of such material.

Associated with the sources of fluid under pressure can be any means, such as conventional valves which can cause a fluctuation or variation of fluid pressure in tubes 24 and 25 in response to or as a result of the occurrence of some predetermined or preselected condition or event. Divider 26 can be aligned with the center of orifice 16a so that the divider can split the main fluid stream which issues from nozzle 16 in half. Both apertures 19 and 20 will then have identical cross-sectional areas and equal portions of the fluid will flow into each aperture in the absence of any fluid issuing from nozzles 17 and 18.

Fluid applied to the feedback nozzle 17 and to the control nozzle 18 causes a flow of fluid to issue therefrom, which interacts with the main fluid stream issuing from power nozzle 16. The interaction results in a deflection of the main stream from the supply nozzle as it passes through chamber 15. A relatively small amount of kinetic energy produced by fluid flow from the control and feedback nozzles causes deflection of a large quantity of fluid, and thus controls a large quantity of energy produced by fluid issuing from power nozzle 16. Amplification is thusly effected by amplifier A for reasons set forth above.

Stilling chambers 21 and 22 are designed to receive fluid energy from apertures 19 and 20, respectively. A portion of this fluid will flow from stilling chambers 21 and 22 through output tubes 121 and 122 communicating with one end of each stilling chamber and the exterior of plate 12. Feedback tube 39 feeds into feedback nozzle 17, as shown. A fluid resistor consisting of a porous plug 41 is fitted into this feedback tube and acts as a fluid resistance to fluid flow through the tube.

In order to fully understand the operation of negative feedback fluid amplifier 101, assume that power nozzle 16 issues a main stream of fluid into chamber 15. The supply nozzle and the supply orifice are positioned such that the divider 26 will split the main stream into two portions which may be equal. Flow from control nozzle 18 will cause deflection of the main stream so that a greater portion of the fluid flows through aperture 19 and into stilling chamber 21 where the velocity is greatly reduced. Consequently, the total fluid pressure in the stilling chamber results primarily from the potential energy of the fluid in the chamber which is substantially at rest. As additional fluid enters chamber 21, the fluid pressure in chamber 21 increases. As the fluid pressure increases, a portion of the fluid will flow through feedback tube 39 and fluid resistor 41 and into feedback nozzle 17, thereby causing an increased flow from the feedback nozzle. Orifice 17a converts the static pressure of fluid in nozzle 17 to kinetic energy. Since feedback nozzle 17 is positioned to act in opposition to flow which may issue from control nozzle 18, it can be seen that the fluid so fed back through feedback tube 39 causes the main stream to be deflected away from aperture 19 and into aperture 20. The action of fluid issuing from nozzle 17 reduces the effect of fluid issuing from control nozzle 18 and thereby tends to cancel out the initial deflection of the main fluid stream caused by fluid issuing from the latter nozzle. This action is, of course, negative feedback.

The amplifier 101 may be employed for two distinct modes of operation; namely, as a pressure regulator or as a signal amplifier. In the former mode of operation, nominally constant pressures are applied to tubes 24 and 25. Variable parameters may tend to affect the output pressure appearing at the outlet 121; these variable parameters being the load and the pressure supplied to tube 23. If the load changes; for instance, if the output fluid flow increases, the pressure in the chamber 21 tends to decrease. The kinetic energy of the fluid issuing from nozzle 17a decreases and the greater proportion of the power jet enters the aperture 19 tending to raise the pressure in chamber 21. If the gain of the amplifier is quite high and the response time of the system minimized the pressure in the chamber 21 remains very nearly constant.

Variations in input pressure of the fluid in the supply tube 23, for instance a decrease in pressure, reduces the fluid flow to the aperture 19 and results in reduction of the pressure in chamber 21. Reduced pressure in chamber 21 reduces the feedback action so that the power stream is deflected by the reduced energy control jet to almost the same extent as before a reduction in supply pressure.

Variation in the power jet; for instance, an increase in pressure, increases the pressure in the chamber 21 and increases the kinetic energy of jet issuing from nozzle 17. This deflects the power jet to the left, as illustrated in FIG. 1, and reduces the proportion of the stream flowing to the aperture 19. Therefore the pressure in the chamber 21 is reduced toward and very nearly to the original value.

It is apparent from the above description that since the feedback flow through nozzle 17a depends primarily upon the fluid pressure in chamber 21, the overall effect of this negative feedback is to maintain a substantially constant pressure in chamber 21 even though the fluid flow velocity from output tube 121 varies over a relatively wide range of fluid flow velocities.

With regard to the application of the present invention to signal amplifiers, negative feedback tends to linearize the relationship between the input and the output signals and minimize the effects of power nozzle pressure and load upon the system. The equations defining the effect of negative feedback amplifier systems are well known and may be found in any standard text book on the subject. In addition to the recognized advantages of feedback amplifiers the feedback action tends to make the output pressure substantially independent of viscosity and temperature of the fluid supplied to power nozzle 16. In general, the feedback action also makes the output pressure substantially independent of changes in shape or size of the feedback amplifier 101 or of any change in the flow characteristics which might, in the absence of negative feedback, change the gain of the fluid amplifier.

Under some circumstances, it is desirable to connect feedback nozzle 17 to a reference source of fluid pressure (not shown) thus providing a bias pressure in nozzle 17 in order that the negative feedback action occur only for variations in the pressure of fluid in chamber 21 from some predetermined value established by said source of reference pressure and by the value of the fluid resistance of porous plug 41. The source of fluid pressure may be any conventional source of fluid under pressure (not shown) and this source communicates with feedback nozzle 17 by means of tube 24a and tube 35. The fluid resistance of porous plug 36 and the magnitude of the reference fluid pressure supplied to tube 35 determines the biasing pressure in nozzle 17 and thereby ultimately determines the pressure which tends to be maintained in the stilling chamber 21.

For purposes of clarity, in FIGS. 2-8 inclusive, all elements or parts which are for the same purpose and which are therefore of substantially the same shape as those elements or parts referred to in FIGS. 1 and 1A will be designated by the same numerals.

FIGS. 2 and 2A illustrate another embodiment of a negative feedback fluid amplifier referred to by numeral 102. In this embodiment, a source of fluid under pressure (not shown), communicates with feedback nozzle 17 by means of tubes 42 and 43. Divider 26 can be positioned to divert any portion of the main stream into either stilling chamber 21 or 22.

As shown in FIG. 2, divider 26 is asymmetrically positioned relative to orifice 16a and chamber 15 so that a greater portion of the fluid initially flows into chamber 21 than into chamber 22. After a sufficient pressure build-up occurs in chamber 21 feedback nozzle 17 will issue fluid sufficient to deflect a greater portion of the main fluid stream into aperture 20 and hence into chamber 22. Therefore before control nozzle 17 receives any fluid from tube 42 the difference between the pressures in chambers 21 and 22 will primarily depend upon the fluid resistance of porous plug 41 and the position of the divider 26.

Fluid may be received by tube 43 from any suitable source of fluid under pressure as a result of the occurrence of some event or condition. Tubes 24 and 35 serve as conduits for supplying a reference pressure to control nozzle 17 for the same purpose set forth above with respect to feedback amplifier 101. By varying the fluid resistance of porous plug 36 the value of the reference pressure can be varied as will be evident.

If tube 42 supplies fluid flow to nozzle 17 as a result of the occurrence of some condition or event a greater portion of the main fluid stream will be deflected into chamber 22. Since less fluid is received by chamber 21 the pressure in this chamber will decrease thereby decreasing the flow of fluid through feedback tube 39. The reduced fluid flow through tube 39 will partially cancel the effect of the fluid flow from tube 42 and the main fluid stream will be less deflected because of this negative feedback action. It should be noted however that amplifier 102 is still responsive to fluid flow from tube 42 even though the effect of fluid from tube 42 tends to be cancelled out by the feedback system. As is the case with amplifier 101, an important advantage of amplifier 102 is that because of negative feedback the pressure in chamber 21 and in fluid issuing from tube 121 will remain substantially constant even though there may be changes or fluctuations in supply pressure from power nozzle 16. For example, if the pressure of fluid supplied to power nozzle 16 decreases momentarily, the pressure in both chambers 21 and 22 will also decrease. The decrease in pressure in chamber 21 causes less fluid to flow through fluid resistor 41 in tube 39 thereby decreasing the deflection of the main stream of fluid issuing from power nozzle 16. Decreasing the deflection of the main stream allows a greater portion of the main stream to flow through aperture 19 and into chamber 21 thus tending to restore the pressure which existed in chamber 21 before the decrease in pressure of fluid supplied to nozzle 16 occurred.

Figure 3:
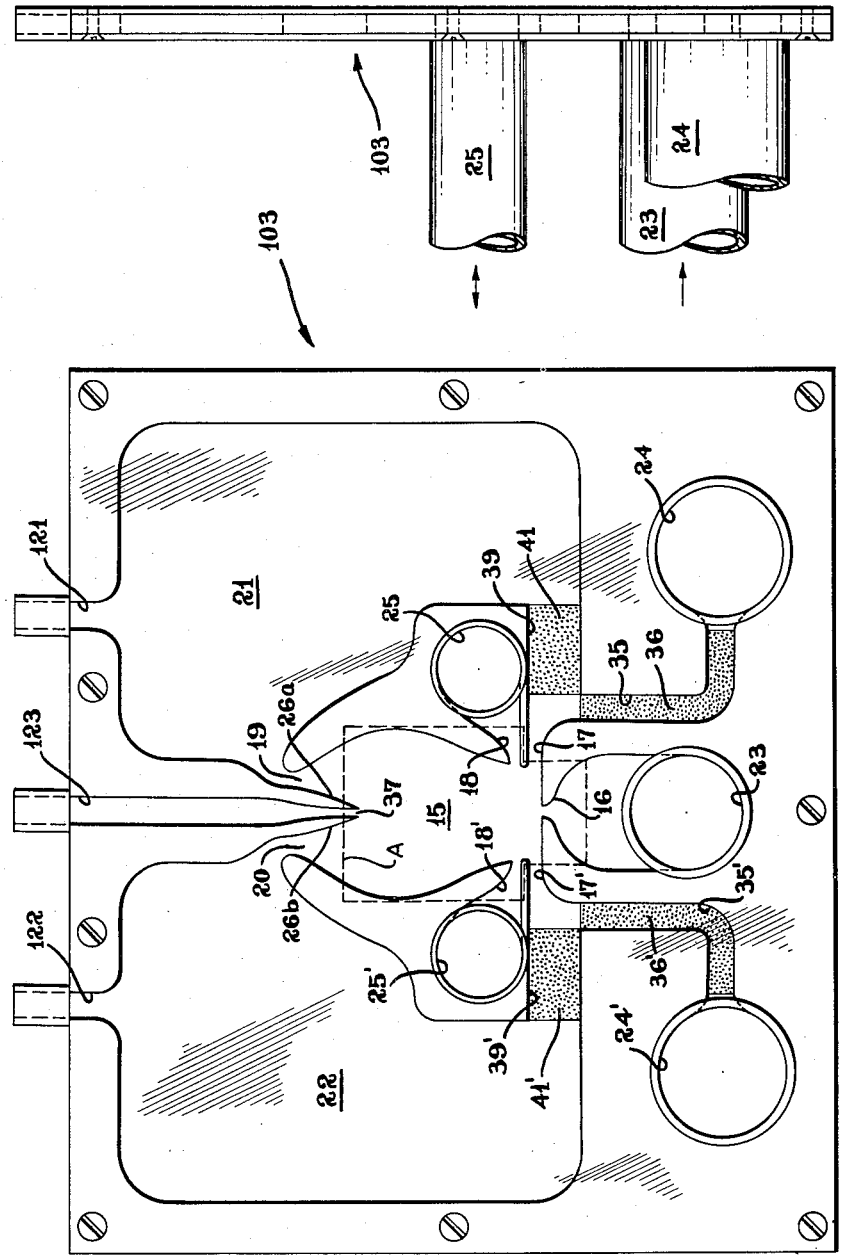
FIG. 3 is a modification of the negative feedback fluid amplifier shown in FIG. 1 in which there is push-pull negative feedback from two apertures.

FIGS. 3 and 3A illustrate another negative feedback fluid amplifier 103 constructed in accordance with the present invention. Amplifier 103 (FIG. 3) comprises chamber 15, power nozzle 16, a pair of opposed feedback nozzles 17, 17', a pair of opposed control nozzles 18, 18', stilling chambers 21 and 22, dividers 26a and 26b, and a pair of feedback tubes 39 and 39'. Porous plugs 41 and 41' are fitted into tubes 39, 39' respectively. Tubes 35 and 35' connect sources of fluid under pressure (not shown) to feedback nozzles 17 and 17' respectively. Porous plugs 36, 36' are fitted into these tubes. Dividers 26a and 26b are positioned so as to initially split the flow pattern of the main fluid stream from power nozzle 16 into three separate streams. The two outside streams enter apertures 19 and 20 and the middle or third stream flows through aperture 37 and into tube 123.

A pressure in feedback nozzles 17 and 17' can be established by fluid from a suitable fluid pressure source (not shown) conveyed through tubes 24 and 24', tubes 35 and 35' and plugs 36 and 36'. If the main stream is deflected by fluid issuing from nozzle 18 or 18' stilling chamber 22 or 21, which is opposite the control nozzle issuing the greater quantity of fluid will experience a pressure build-up. The feedback tube 39' or 39 which communicates with that stilling chamber into which the additional fluid enters will immediately issue additional fluid to the corresponding feedback nozzle 17' or 17 and so tend to restore the stream to its initial flow pattern. It should be evident that amplifier 103 provides three separate openings in tubes 121, 122 and 123, through which predetermined portions of fluid can pass. The portion of fluid in any tube will depend upon the position of dividers 26a and 26b relative to chamber 15 as well as upon the deflection caused by fluid issuing from either or both feedback nozzles 17 and 17'. Amplifier 103 is also responsive to fluid issuing from either control nozzle 18 or 18', and by utilizing negative feedback the effect of variations in flow from the power or control nozzle is reduced, as should be evident. Thus, even though instantaneous decreases occur in fluid flow from the power nozzle 16, the difference between the pressure of the fluid issuing from tubes 121, 122 and 123 will tend to remain substantially uniform.

Figure 4:
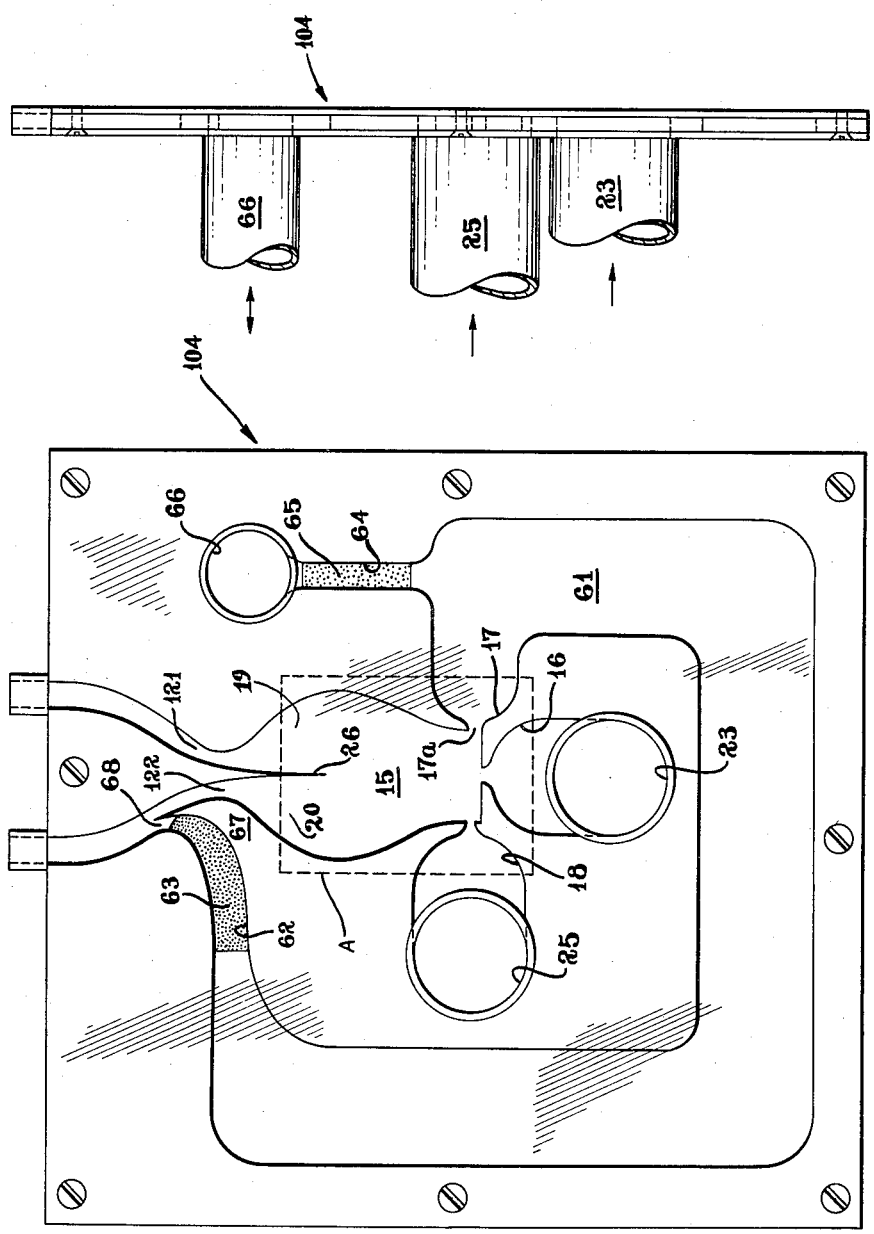
FIG. 4 is a plan view of a negative fluid amplifier in which the negative feedback is responsive to output flow velocity.

Amplifier 104, illustrated in FIGS. 4 and 4A, is capable of maintaining substantially constant output flow velocity from tubes 121 and 122 even though control nozzle 18 issues a stream of fluid into chamber 15. Amplifier 104 is responsive to flow velocity of the main fluid stream as will be hereafter evident. As shown in FIG. 4, feedback nozzle 17 and control nozzle 18 communicate with amplifier A. Reservoir 61 communicates with feedback nozzle 17 and with tube 62, and is capable of storing fluid energy. Porous plug 63 is tightly inserted into tube 62. Tube 64 at the other end of reservoir 61 has a porous plug 65 inserted therein and communicates with tube 66. A suitable source of fluid under pressure (not shown) may be connected to tube 66, and a valve (not shown) may be used to vary flow of fluid from this source through tube 66. Reservoir 61 can be at any predetermined pressure by adjusting such a valve.

The end of tube 62 and the tip of blade 67 form an orifice 68. Because blade 67 curves downstream of tube 122, fluid flowing through tube 122 and across orifice 68 causes a wake and resulting low pressure region at orifice 68. A low pressure so developed will tend to cause fluid to flow from reservoir 61 through plug 63 and into tube 122.

Fluid issuing from feedback nozzle 17 will deflect the main fluid stream issuing from power nozzle 16 so that this stream assumes a predetermined flow pattern in amplifier A which is split by divider 26. Should control nozzle 18 issue a deflecting fluid stream as a result of an increase in pressure of the fluid in tube 25, aperture 20 will receive a lesser portion of fluid in the main stream while aperture 19 receives a greater portion of the fluid.

When fluid enters aperture 20 and tube 122, a wake and resulting low pressure is created across orifice 68 because of the curved shape of blade 67. The greater the velocity or rate of fluid flow across orifice 68 the greater the resulting low pressure region. The low pressure region so developed across the orifice causes fluid to flow from reservoir 61 through tube 62 and into tube 122, thereby decreasing the pressure in reservoir 61 below that produced by tubes 64 and 66 and its associated source of fluid pressure (not shown). As less fluid passes over blade 67 as a consequence of the main stream being deflected by control nozzle 18, the amount of fluid withdrawn from reservoir 61 through tube 62 decreases, because the pressure increases across orifice 68. Since less fluid is withdrawn from the reservoir 61, the pressure in the reservoir builds up causing a greater quantity of fluid to issue from feedback nozzle 17. Consequently, the main fluid stream tends to be deflected from aperture 19 towards aperture 20 by fluid from nozzle 17. Fluid from nozzle 17 thus tends to counteract the deflecting effect of fluid flowing from control nozzle 18. Thus, the negative feedback system provided by reservoir 61 and tube 62 cooperating with blade 67 and nozzle 17 tends to maintain the initial flow pattern of the main fluid stream prior to introduction of deflecting fluid from nozzle 18.

The relative size of orifice 17a of nozzle 17 and orifice 68, as will be evident to those skilled in the art, will depend upon the fluid flow velocity, density and viscosity of the fluid. System 104 operates satisfactorily with water as the fluid when orifice 17a is smaller in size than orifice 68.

Figure 5:
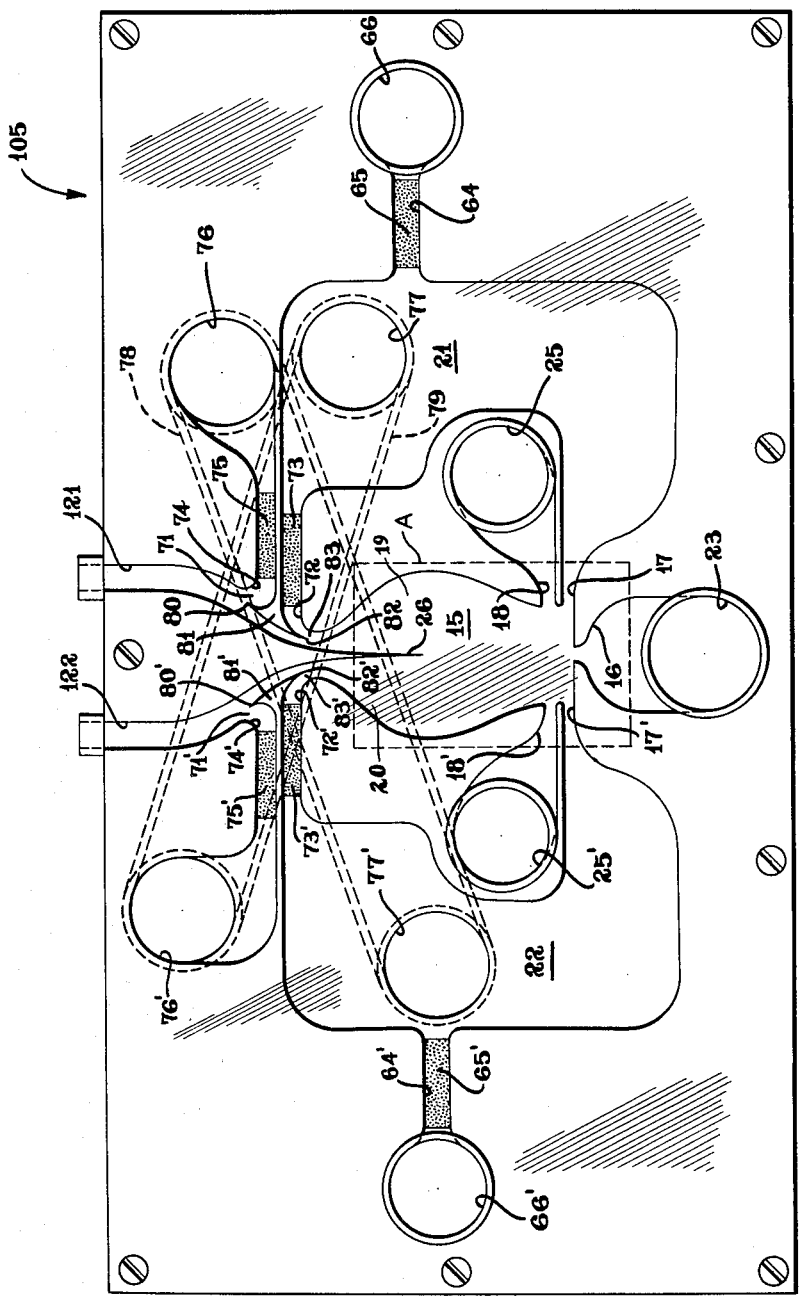
FIG. 5 is a plan veiw of a push-pull negative feedback fluid amplifier in which the negative feedback is responsive to output flow velocity. In this embodiment there is negative feedback through four paths.

FIGS. 5 and 5A illustrate another embodiment of a negative feedback fluid amplifier 105 which is responsive to the velocity of fluid flow and employs four negative feedback paths. In FIG. 5A, tubes 25 and 25' which convey fluid to control nozzles 18 and 18' are omitted for purposes of clarity. Amplifier 105A includes chamber 15, power nozzle 16, feedback nozzles 17 and 17', opposed control nozzles 18 and 18'. In addition, amplifier 105 includes a pair of stilling chambers 21 and 22, a pair of fluid receiving tubes 72 and 72', fluid resistances 73 and 73' incorporated in tubes 72 and 72', output tubes 121 and 122, opposite pairs of fluid exhausting tubes 74 and 74' having porous plugs 75 and 75' fitted therein. Tubes 74 and 74' communicate with openings 76 and 76', respectively. Openings 76 and 76' communicate with stilling chamber openings 77 and 77', respectively by means of tubes 78 and 79, respectively.

In order to establish a predetermined flow pattern in chamber 15, stilling chambers 21 and 22 are connected to suitable sources of reference pressure (not shown) by tubes 66 and 66', respectively. Porous plugs 65 and 65' are fitted into tubes 64 and 64', respectively and provide any desired pressure drop between chambers 21 and 22 and the reference sources of pressurized fluid (not shown).

By suitable choice of reference pressures, predetermined pressures can be maintained in chambers 21 and 22. Some of this fluid will, of course, pass through the feedback nozzles 17 and 17'. If equal quantities of fluid flow through each feedback tube and feedback nozzle, then the resultant effect on the main fluid stream issuing from power nozzle 16 will be balanced out, because the tubes and feedback nozzles are in opposed relationship. If a greater quantity of fluid issues from feedback nozzle 17, as a result of more fluid issuing from tube 64 than issues from tube 64', then the main fluid stream will be deflected towards aperture 20. Thus, the fluid flow pattern can be varied by suitably adjusting the flow of fluid from tubes 64 and 64'.

Orifices 71 and 71' of tubes 74 and 74' are partially defined by the down-stream edges 80 and 80' of blades 81 and 81'. These edges extend inwardly into tubes 121 and 122 and are so shaped that a wake or region of low pressure is created across each orifice 71 and 71' when fluid flows over blades 81 and 81', respectively. Edges 82 and 82' form the other ends of blades 81 and 81' and extend upstream of tubes 121 and 122. Edges 82 and 82' partially define orifices 83 and 83' at the ends of tubes 72 and 72' and are positioned to scoop fluid into tubes 72 and 72' through fluid resistances 73 and 73' and ultimately into stilling chambers 21 and 22.

When fluid passes over blades 81 and 81' as a result of power nozzle 16 issuing fluid, the wake effect produced by the edges 80 and 80' causes fluid to exhaust from chambers 22 and 21, respectively, through tubes 74 and 74' and into tubes 121 and 122. Since edges 82 and 82' protrude upstream into tubes 121 and 122, fluid entering apertures 19 and 20 will be scooped into orifices 83 and 83'. Fluid entering orifices 83 and 83' also enters chambers 21 and 22 increasing the pressure therein. Control nozzles 18 and 18' are connected through tubes 25 and 25' to sources of fluid under pressure (not shown) and the amount of fluid which enters these control nozzles can be varied by turning any conventional valve (not shown) associated with the control nozzle manually, or by some mechanism in response to the occurrence of any preselected or predetermined condition or event. Fluid issuing from either control nozzle will tend to direct the main fluid stream issuing from power nozzle 16 towards an opposite aperture, as discussed previously.

For purposes of illustrating the operation of amplifier 105, assume that the flow pattern of the main fluid stream is divided equally by divider 26 into apertures 19 and 20 and thereafter into tubes 121 and 122. Edges 12 and 82' will scoop a portion of each stream so divided into stilling chambers 21 and 22, increasing the pressure within each reservoir and causing equal quantities of fluid to issue from each feedback nozzle 17 and 17'. Since feedback nozzles 17 and 17' are opposed, the resultant effect of this fluid on the main fluid stream will be balanced out when the various elements comprising the amplifier 105 are equal in size and symmetrical with respect to divider 26. The remaining portion of the fluid stream which passes over blades 81 and 81' creates a region of low pressure across orifices 71 and 71'. Regions of low pressure so created cause reductions in fluid pressures in opposite stilling chambers because of the connection between openings 76 and 76' and openings 77' and 77, respectively, by tubes 78 and 79, respectively. When no fluid issues from control nozzle 18 or 18', the effect of fluid flowing from tubes 74 and 74' reduces the pressure in chambers 22 and 21, respectively, and will also tend to maintain the main stream in a flow pattern such that equal quantities of fluid flow through tubes 121 and 122.

Should more fluid issue from control nozzle 18 than issues from control nozzle 18', the opposite aperture 20 will receive a greater portion of the mainstream than does aperture 19, and therefore the fluid in tube 122 will flow at a greater rate. Fluid-receiving tube 72' will receive more fluid causing the pressure in chamber 22 to increase. The increased flow rate over orifice 71' lowers the pressure there so that fluid-exhausting tube 74 exhausts more fluid from chamber 21, thereby lowering the pressure in that chamber. Simultaneously, the deflection of the main stream by fluid issuing from control nozzle 18 causes aperture 19 to receive less fluid, producing a lower flow velocity in tube 121. Lower flow velocity across orifice 71 causes less fluid to be drawn through tube 74 from chamber 22 thus increasing the pressure in chamber 22. The decreased flow velocity through tube 121 produces a lower pressure at orifice 83 and hence less fluid flows through tube 72 into chamber 21, thereby lowering the pressure in chamber 21.

The combined effect of these four negative feedback paths 72, 72', 74, 74' is to increase the pressure in chamber 22 and cause an increase in fluid flow from feedback nozzle 17', and simultaneously, to decrease the fluid pressure in chamber 21 and provide a decreased fluid flow through feedback nozzle 17. The increase in flow from nozzle 17' opposes the fluid issuing from control nozzle 18 and thereby accomplishes negative feedback. Concurrently, the decreased flow from nozzle 17 which is on the same side of chamber 15 as nozzle 18 will also decrease the deflection of the main stream towards aperture 20 below that which would have occurred if the flow from nozzle 17 did not decrease. Reducing the flow from nozzle 17 also accomplishes negative feedback action.

As stated above, if the chambers 21 or 22 or parts thereof be made of elastically deformable material, then incompressible as well as compressible fluids used in the amplifiers shown in FIGS. 1–5 inclusive can take advantage of the smoothing action of these fluid storage means. FIGS. 6, 6A, 7 and 7A illustrate fluid negative feedback amplifiers which do not require elastically deformable or compressible stilling chambers or reservoirs to function properly with incompressible fluids.

FIGS. 6 and 6A illustrate another embodiment of a negative feedback fluid amplifier designated by numeral 106. Amplifier 106 is specifically designed to employ an incompressible fluid. As shown in FIG. 6, negative feedback fluid amplifier 106 consists of a fluid amplifier A in combination with a pair of stilling chambers 21 and 22. Each stilling chamber 21 and 22 communicates with tubes 85 and 85' respectively, and with feedback tubes 86 and 86' as well as with output tubes 121 and 122. Porous plugs 87 and 87' are fitted into tubes 86 and 86', respectively. Stilling chambers 21 and 22 are capable of decreasing the velocity of the moving fluid entering the chamber so that the flow through feedback tubes 86 and 86' and through output tubes 121 and 122 is essentially dependent only upon total pressure in these stilling chambers. Tubes 85 and 85' are extensions of apertures 19 and 20.

An incompressible liquid stream issuing from the supply nozzle 16 passing through chamber 15 is split by divider 26 into the stilling chambers 21 and 22 wherein the fluid comes substantially to rest. A portion of this fluid will flow from tubes 121 and 122. As the fluid pressure in chambers 21 and 22 increases a quantity of fluid will flow through feedback tubes 86 and 86' through porous plugs 87 and 87' into feedback nozzles 17 and 17'. Fluid issuing from nozzles 17 and 17' is capable of deflecting the main fluid stream issuing from nozzle 16.

When negative feedback fluid amplifier 106 is made symmetric about a line through the center of divider 26 and through the center of nozzle orifice 16a and when in addition, equal quantities of fluid flow are provided to nozzles 18 and 18', substantially equal quantities of fluid will issue from both feedback nozzles 17 and 17'. Since these nozzles are opposed, the effect of fluid energy issuing therefrom on the main fluid stream will be balanced out and the main fluid stream will divide equally into stilling chambers 21 and 22.

Should either control nozzle 18 or 18' issue a greater quantity of fluid, the main stream will be deflected into either aperture 20 or 19, respectively, increasing the pressure in stilling chamber 22 or 21, respectively. Such a pressure increase in one of the stilling chambers causes an increase in the flow through the feedback tube 86' or 86 respectively and finally through the feedback nozzle 17' or 17 respectively. This additional fluid will tend to deflect the main fluid stream in opposition to the deflecting action produced by the control nozzle 18 or 18'. Porous plugs 87 and 87' will smooth out any recurring changes in flow in either feedback tube 86 or 86' as a result of sudden increases in fluid pressure in chamber 21 or 22. Since the signal fed back to amplifier A is a pressure signal for given input pressures, amplifier 106 will tend to maintain constant pressure differentials between chambers 21 and 22, even though the output tubes are unevenly loaded. The fluid in tubes 86 and 86' has inertia because of its mass. The fluid inertia acting in conjunction with the resistance of fluid resistors 87 and 87' tends to smooth out fluctuations in fluid flow in the feedback paths and thus ensures that amplifier 106 will not oscillate. If a compressible fluid were employed, the inertance in tubes 86 and 86' would not be appreciable and consequently the two tubes would merely augment the fluid capacitance of chambers 21 and 22.

Figure 7:
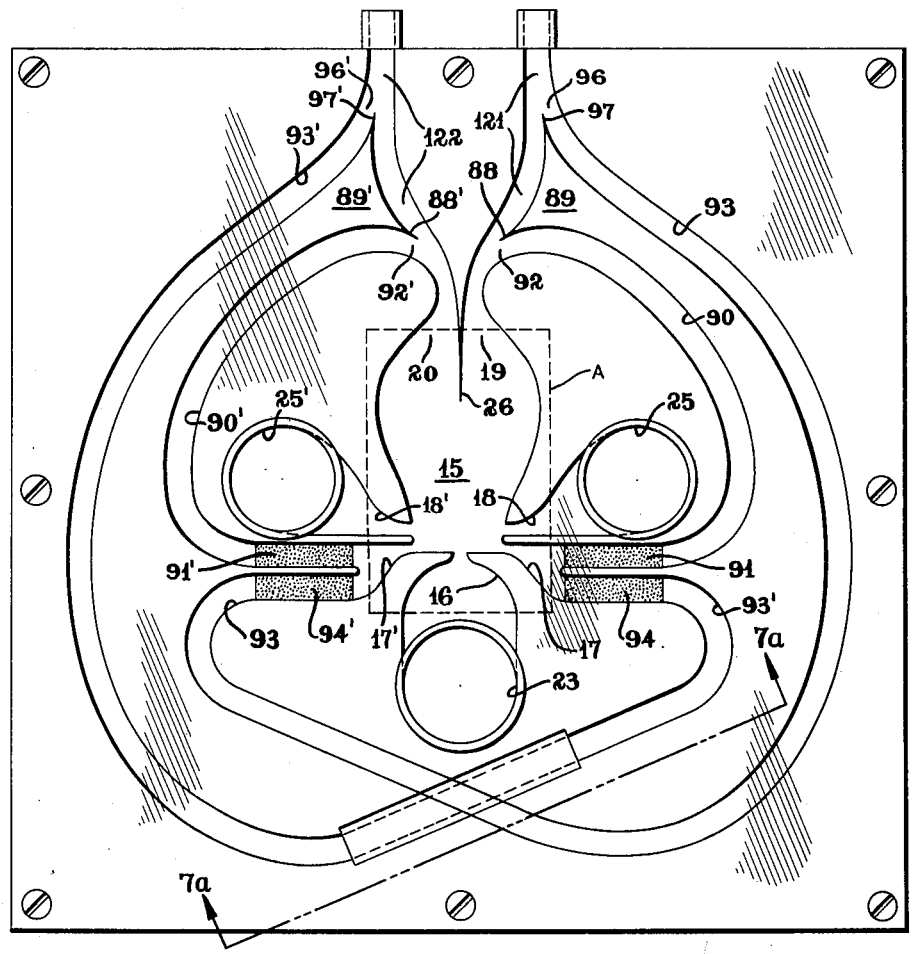
FIG. 7 is a plan view of a push-pull negative feedback fluid amplifier specifically designed for use with incompressible fluids and in which the negative feedback is responsive to flow rate.
Figure 7A:
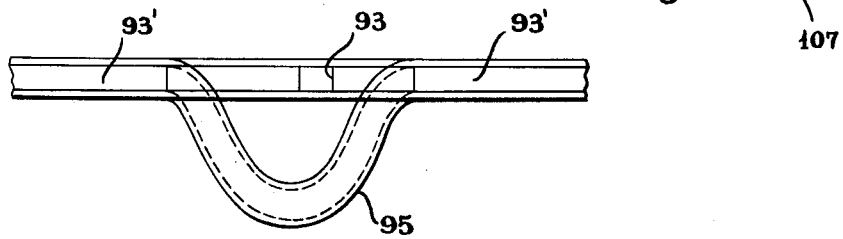
FIG. 7A is an end view of the amplifier shown in FIG. 7.

FIGS. 7 and 7A illustrate another embodiment of a negative feedback fluid amplifier 107 in which the feedback signal is responsive to the velocity of fluid flow at the output of the amplifier. Negative feedback fluid amplifier 107 utilizes the inertia of fluid in tubes to accomplish the smoothing action of the feedback signal. The mass of fluid in a tube, especially an incompressible fluid, gives an opposing force to an accelerating force when that fluid is accelerated by the action of a pressure at one end of the tube. Negative feedback fluid amplifier 107 employs this inertial effect in four feedback paths, provided by tubes 90, 90', 93 and 93'.

Nozzle 16 issues the main stream of fluid into chamber 15 and hence into apertures 19 and 20 and tubes 121 and 122. Inwardly projecting edges 88 and 88' of curved blades 89 and 89' scoop off a predetermined portion of the fluid flowing in tubes 121 and 122 respectively, thus, providing a pressure in openings 92 and 92', which causes fluid to flow through tubes 90 and 90', thereby causing fluid to issue from nozzles 17 and 17' respectively. The remaining portion of the fluid flowing through tubes 121 and 122 flows past the protruding down stream curved edges 97 and 97' respectively of curved blades 89 and 89', thereby producing in openings 96 and 96' low pressure regions. The low pressure regions in openings 96 and 96' under some conditions cause fluid from 93 and 93' to exhaust into tubes 121 and 122 respectively. Under other conditions, for example when the fluid in tubes 93 and 93' is flowing from openings 96 and 96' toward porous plugs 94' and 94 respectively, then the fluid flowing through tubes 121 and 122 past edges 97 and 97' can decrease the pressure in openings 96 and 96' causing a decrease in fluid flow from these openings. The fluid flowing through 93 and 93' passes through porous plugs 94' and 94 and thus provides fluid flow into nozzles 17' and 17 respectively. Tube 95 shown in FIG. 7A connects two sections of tube 93'.

The total flow of fluid from nozzles 17 and 17' depends upon the total amount and direction of flow in tubes 90, 90', 93 and 93' and thus depends upon the pressures produced in openings 92, 92', 96 and 96'. The pressures in these openings depend upon the velocity of fluid flowing in tubes 121 and 122. It can thus be seen that the signal fed back in amplifier 107 depends upon fluid flow velocity. It can thus be termed "velocity" feedback.

Input nozzles 18 and 18' provide means for introducing into amplifier 107 fluid flow corresponding to some predetermined set of conditions and constitute a mean of controlling the fluid flow in negative feedback amplifier 107. If, for example, the input pressure to tube 25 be raised above the pressure in tube 25', control nozzle 18 will issue a greater quantity of fluid than control nozzle 18'. The main stream issuing from nozzle 16 will, under these conditions, be deflected in such a manner that a greater portion of the main stream will flow into aperture 20 and through tube 122 and a lesser portion of the main stream will flow through aperture 19 and into tube 121. In this instance the pressure in opening 92' will be increased because of the increase in fluid flow velocity through tube 122, and the pressure in opening 96 will be increased because of the decreased fluid flow velocity in tube 121. The increased pressures in openings 96 and 92' will cause an increasing amount of fluid to flow through tubes 93 and 90', respectively, through porous plugs 94' and 91', respectively, into nozzle 17' which will thereupon issue a greater quantity of fluid.

The deflection of the main stream by fluid issuing from nozzle 18 which causes an increase in fluid flow velocity in tube 122 and a lesser fluid flow velocity in tube 121 will cause a decrease in pressure in openings 92 and 96' which will cause a decrease in fluid flow through tubes 90 and 93', respectively, through porous plugs 91 and 94, respectively, thus causing nozzle 17 to issue a lesser quantity of fluid. The combined effect of the increased fluid flow issuing from nozzle 17' and the decreased fluid flow issuing from nozzle 17 tend to counteract the deflection of the main stream brought about by the increase in fluid flow from nozzle 18. Thus the effect of the four feedback paths is to make amplifier 107 less sensitive to fluid flowing from nozzles 18 and 18'. It is thus a negative feedback action which makes amplifier 107 tend to be less sensitive to fluctuations in supply pressure, temperature, viscosity, and other characteristics of the fluid supplied to the system. Negative feedback fluid amplifier 107 also tends to maintain a linear relationship between the fluid input signal to nozzles 18 and 18' and the output fluid flow velocity through tubes 121 and 122. Amplifier 107 is particularly suited for use with an incompressible fluid since the smoothing action in the feedback path depends upon the inertial effects of fluid in a tube and these inertial effects are most effective when an incompressible fluid is used.

Figures 8, 8A:
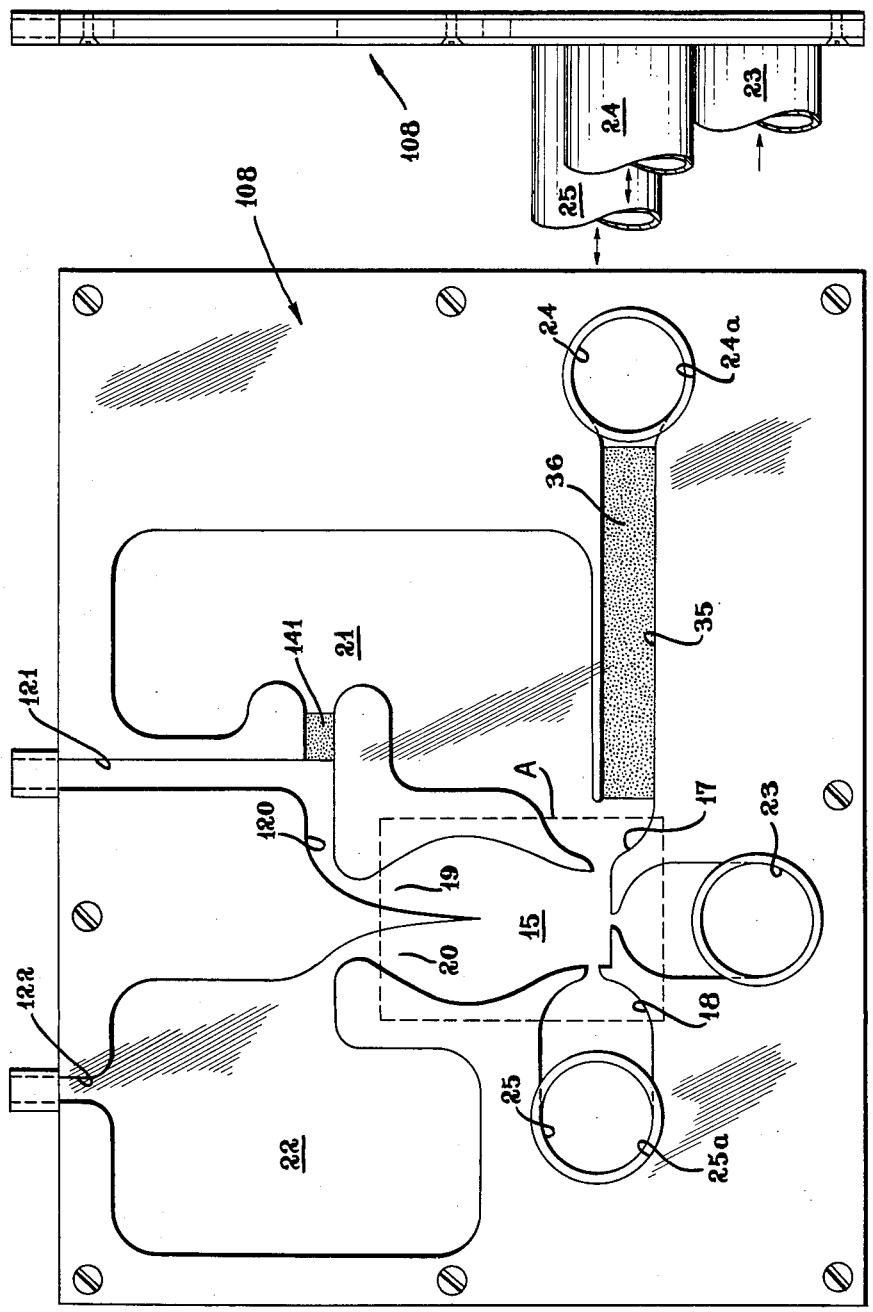
FIG. 8 is a plan view of another negative feedback fluid amplifier in which the negative feedback is responsive to total output pressure.
FIG. 8A is an end view of FIG. 8.

Negative feedback fluid amplifier 108, shown in FIG. 8, is a negative feedback fluid amplifier which depends upon total pressure at output tube 121 for its feedback signal. Negative feedback fluid amplifier 108 comprises the usual amplifier A. Receiving aperture 19 is connected to tube 120 which directs fluid against a fluid resistor. The right angle connection between tube 120 and output tube 121, insures that full dynamic pressure will be provided to fluid resistor 141. The fluid flowing through fluid resistor 141 will provide a pressure in chamber 21 corresponding to the full dynamic pressure of the fluid flowing through tube 120. The amount of fluid issuing from nozzle 17 will depend upon the pressure in chamber 21. Nozzle 17 is also connected to a suitable source of reference pressure (not shown) by means of tube 35, porous plug 36, and tube 24. The reference pressure provides fluid to nozzle 17 to achieve some predetermined flow pattern of the main stream issuing from nozzle 16 into chamber 15.

Control nozzle 17 is connected to tube 25, and provides a means of introducing into amplifier 108 a controlling signal. Stilling chamber 22 is provided to bring the fluid flowing from aperture 20 to rest before feeding it to the output.

Suppose, for example, an increase in pressure of fluid in tube 25 causes nozzle 18 to issue a greater quantity of fluid. The increased fluid flow from nozzle 18 will deflect the main stream so that a larger portion will flow through aperture 19 into tube 120 thus increasing the dynamic pressure provided to porous plug 141. This increase in pressure will cause an increasing quantity of fluid to flow through fluid resistor thus increasing the pressure in chamber 21. This increase in chamber pressure will cause nozzle 17 to issue a greater quantity of fluid, thus tending to oppose the deflecting action of the fluid issuing from nozzle 18. This opposing action is negative feedback, and has the effect of decreasing the sensitivity of the system to fluctuations in supply pressure, viscosity. Negative feedback fluid amplifier 108 employs stilling chamber 21 in the feedback network in order to bring the feedback fluid to rest before feeding it back to feedback nozzle 17. The use of this stilling chamber thus diminishes the effect of velocity in the feedback path.

Negative feedback amplifiers 104 (FIG. 4), 105 (FIG. 5), 106 (FIG. 6), 107 (FIG. 7), and 108 (FIG. 8) employ a smoothing action in the negative feedback paths. The effect of this smoothing action is to delay the action of this negative feedback signal.

The term "input signal" as used herein is the fluid signal which is intentionally supplied to the negative feedback fluid amplifier for the purpose of instructing or commanding the amplifier A to provide a desired output signal. The term "output signal" used herein is the fluid signal which is produced by the negative feedback fluid amplifier at its output tubes. The input and output signals may take the form of time or spatial variations in pressure, density, flow velocity, mass flow rate, fluid composition, transport properties, or other thermodynamic properties of the input fluid individually or in combination thereof.

The over-all effect is then that the above mentioned amplifiers respond initially to an input signal substantially as though there were no negative feedback path. The negative feedback action, however, is soon provided by the negative feedback path and is then fully effective. For variations of the input signal the above mentioned negative feedback amplifiers tend to provide an output fluid flow velocity of an output fluid flow pressure which depends upon the time variation of this input fluid signal. This derivative action means that these amplifiers can be used where a derivative action is desired. If a sudden increase in pressure were provided to the control nozzle 18 of any of the aforementioned amplifiers, there would be a rapid increase in fluid flow velocity or fluid pressure in the opposite output tube of any of the aforementioned amplifiers. After a sufficient time has elapsed for the feedback signal to pass from the output through the feedback network to the input, the feedback action becomes fully effective. This feedback action then decreases the fluid flowing out of that output tube below the peak value. Thus any of the above amplifiers can be used to convert a sudden increase of pressure into a short pulse of fluid flow or fluid pressure.

Negative feedback fluid amplifiers 101 (FIG. 1), 102 (FIG. 2), 103 (FIG. 3) employ a smoothing action in the negative feedback path so arranged that the feedback signal undergoes substantially the same smoothing action as the output signal. These amplifiers then do not tend to give the differentiating action referred to above, since the feedback signal occurs within a short period of time after the signal arrives at the output.

Figure 9:
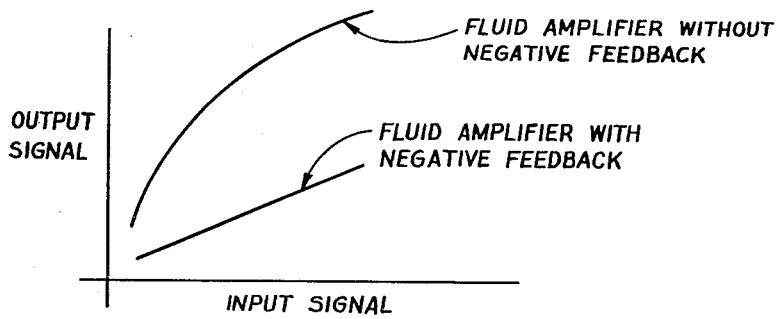
FIG. 9 illustrates the relationship between the input signal and output signal for a fluid amplifier without negative feedback and the more linear relationship obtained with a fluid amplifier having negative feedback.

FIG. 9 illustrates the linear relationship between the input signal supplied to amplifier A and the output signal issuing from tubes 121 and 122 for a fluid amplifier A without negative feedback, such as disclosed in the aforementioned patent applications of Billy M. Horton and the aforementioned patent applications of Romald E. Bowles and Raymond W. Warren, as compared to a typical fluid amplifier A with negative feedback, constructed in accordance with the instant invention. Since the output signal from a fluid amplifier with negative feedback tends to be constant when the input signal varies, the slope of the input-output curve representing a fluid amplifier with negative feedback is considerably less than the slope of the curve of the amplifiers disclosed in the aforementioned applications.

Figure 10:
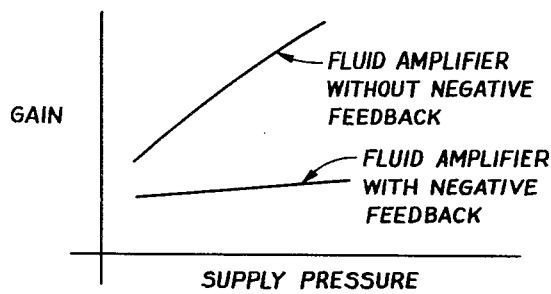
FIG. 10 illustrates the substantially constant gain which is obtained with a fluid amplifier with negative feedback, as compared to the gain obtained with fluid amplifier without negative feedback.

FIG. 10 illustrates the substantially constant power gain which is obtainable by a fluid amplifier with negative feedback, as compared to the power gain obtainable by fluid amplifier without negative feedback.

Figure 11:
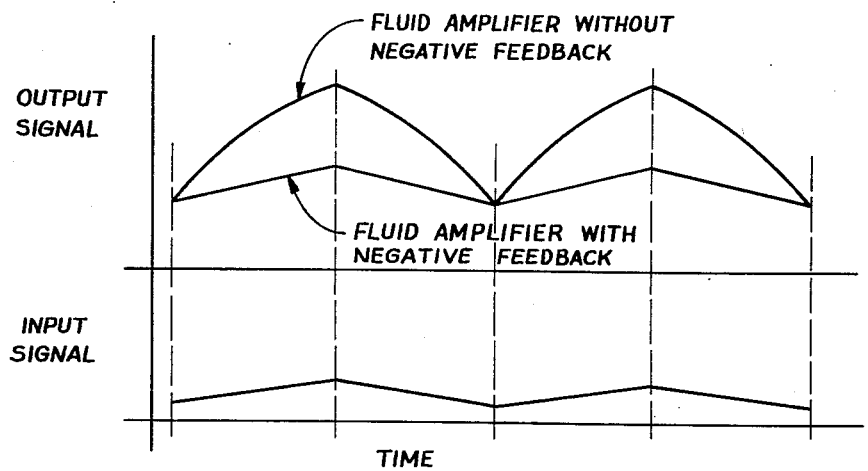
FIG. 11 illustrates graphically the improvement in fidelity of output signal obtainable by using a typical negative feedback fluid amplifier, as compared to the output signal produced by an amplifier in which negative feedback is not used.

FIG. 11 illustrates graphically the characteristics of the output signal of fluid amplifiers with and without negative feedback when both types of fluid amplifiers have the same input signals which vary as shown.

It will be apparent that the embodiments shown are only exemplary and that various modifications can be made in construction and arrangement within the scope of the invention as defined in the appended claims.

I claim as my invention:

1. A negative feedback fluid amplifier adapted to provide a substantially constant fluid flow therefrom, comprising a fluid amplifier adapted to issue a main stream of fluid, a fluid feedback path having an opening for receiving and feeding back a portion of said main fluid stream into said amplifier, said fluid feedback path being constructed and arranged such that fluid fed back to said amplifier deflects said main stream so that less fluid flows into said opening, and means in said feedback path adapted to smooth out any variations of fluid flow therein.

2. A negative feedback fluid amplifier adapted to provide a substantially constant fluid flow therefrom, comprising a fluid amplifier adapted to issue a main stream of fluid, a fluid feedback path having an opening for receiving and feeding back a portion of said main fluid stream into said amplifier, said fluid feedback path being so constructed and arranged that fluid fed back to said amplifier deflects said main stream so that less fluid flows into said opening, means in said feedback path adapted to smooth out any variations of fluid flow therein, and means for issuing a control fluid into said amplifier in response to the occurrence of some predetermined condition.

3. A negative feedback fluid amplifier adapted to provide a substantially constant fluid flow therefrom, comprising a fluid amplifier adapted to issue a main stream of fluid, a fluid feedback path having an opening for receiving and feeding back a portion of said main fluid stream into said amplifier, said fluid feedback path being constructed and arranged such that fluid fed back into said amplifier deflects said main stream so that less fluid flows into said opening, means in said feedback path adapted to smooth out any variations of fluid flow therein, means for issuing a control fluid into said amplifier in response to the occurrence of some predetermined condition, and means actuated by fluid issuing from said amplifier.

4. A negative feedback fluid amplifier adapted to provide a substantially constant fluid flow therefrom, comprising a fluid amplifier adapted to issue a main stream of fluid, a fluid feedback tube having an opening for receiving and feeding back a portion of said main fluid stream into said amplifier, said fluid feedback tube being so constructed and arranged that fluid fed back into said amplifier deflects said main stream so that less fluid flows into said opening, and means in said feedback tube adapted to smooth out any variations of fluid flow therein.

5. A negative feedback fluid amplifier adapted to provide a substantially constant fluid flow therefrom, comprising a fluid amplifier adapted to issue a main stream of fluid, a fluid feedback tube, means for storing fluid communicating with said feedback tube and said main stream issuing from said amplifier, said means for storing fluid adapted to receive and store a portion of said main stream, said feedback tube communicating with said amplifier and positioned so as to deflect said main stream such that less fluid is received by said fluid storage means when fluid flows through said feedback tube, means in said feedback tube adapted to smooth out variations in fluid flow therethrough, and means actuated by fluid issuing from said amplifier.

6. A negative feedback fluid amplifier adapted to provide a substantially constant fluid flow therefrom, comprising a fluid amplifier adapted to issue a main stream of fluid, means for receiving and storing a portion of said main stream, a feedback tube communicating with said means and said amplifier and constructed and arranged so that fluid issuing therefrom deflects said main stream in a predetermined direction whereby less fluid is received by said fluid storage means, means in said feedback tube adapted to smooth out variations in fluid flow therethrough, means actuated by fluid issuing from said amplifier, and means adapted to issue a control fluid into said amplifier so as to deflect said main stream in response to some predetermined condition.

7. A fluid-operated system comprising means for issuing a stream of fluid, fluid-receiving means positioned to receive said stream of fluid, control means adapted to establish a pressure gradient across said stream so as to vary the direction and quantity of fluid received by said fluid-receiving means, and feedback means positioned to intercept a part of said stream entering said fluid-receiving means, said feedback means feeding back the fluid intercepted so as to decrease the pressure gradient established by said control means.

8. The fluid-operated system as claimed in claim 7, wherein said stream of fluid is confined to the plane of deflection of said stream.

9. The fluid-operated system as claimed in claim 7, wherein said feedback means includes means for storing fluid energy as potential energy.

10. The fluid-operated system as claimed in claim 7, wherein said feedback means includes means for storing fluid energy as kinetic energy.

11. The fluid-operated system as claimed in claim 7, wherein said feedback means includes means for storing fluid energy as potential energy and as kinetic energy.

12. A fluid-operated system comprising means for issuing a stream of fluid, fluid-receiving means positioned to receive said stream of fluid, control means adapted to establish a pressure gradient across said stream so as to vary the direction and quantity of fluid received by said fluid-receiving means, feedback means positioned to intercept a part of said stream entering said fluid-receiving means, said feedback means feeding back the fluid received thereby so as to decrease the pressure gradient established by said control means, and means communicating with said fluid-receiving means responsive to variations in parameter of said fluid stream.

13. The fluid-operated system as claimed in claim 12, wherein said stream of fluid is confined to the plane of deflection of said stream.

14. The fluid-operated system as claimed in claim 12, wherein said feedback means includes means for storing fluid energy as potential energy.

15. The fluid-operated system as claimed in claim 12, wherein said feedback means includes means for storing fluid energy as kinetic energy.

16. The fluid-operated system as claimed in claim 12, wherein said feedback means includes means for storing fluid energy as potential energy and as kinetic energy.

17. A negative feedback fluid amplifier comprising a fluid amplifier adapted to issue a main stream of fluid, and a fluid feedback path having an opening for receiving and feeding back a part of said main fluid stream to said amplifier, said feedback path feeding back fluid to said amplifier which deflects said main stream so that less fluid flows into said opening.

No references cited.